United States Patent [19]

Schmidt, Jr.

[11] 3,897,609

[45] Aug. 5, 1975

[54] SAUSAGE STUFFER WITH QUICK-RELEASE SAFETY RING

[75] Inventor: Carl Oscar Schmidt, Jr., Cincinnati, Ohio

[73] Assignee: The Cincinnati Butchers' Supply Company, Cincinnati, Ohio

[22] Filed: Oct. 1, 1973

[21] Appl. No.: 402,194

[52] U.S. Cl. .................. 17/39; 220/55 G; 220/57; 220/3; 220/33
[51] Int. Cl. ............................................. A22c 11/06
[58] Field of Search .......... 17/39, 35; 220/55 G, 57, 220/3, 33

[56] References Cited
UNITED STATES PATENTS

| | | |
|---|---|---|
| 1,628,726 | 5/1927 | Knowlton .............................. 17/39 |
| 1,682,371 | 8/1928 | Crossley ............................... 220/33 |
| 3,349,947 | 10/1967 | Zumwalt .......................... 220/33 X |
| 3,579,715 | 5/1971 | Schmidt ................................ 17/39 |

Primary Examiner—Richard C. Pinkham
Assistant Examiner—William R. Browne
Attorney, Agent, or Firm—J. Warren Kinney, Jr.

[57] ABSTRACT

The sausage stuffer includes a safety ring to preclude accidental forceful blow-out of the extrusion piston from its cylinder, and which safety ring has a quick-release mounting upon the stuffer cylinder to facilitate and expedite displacement of the safety ring for periodic cleaning. A bolt pivotally secures the flange and the safety ring together. The safety ring has bolts and slots to engage associated slots and bolts on the flange.

6 Claims, 5 Drawing Figures

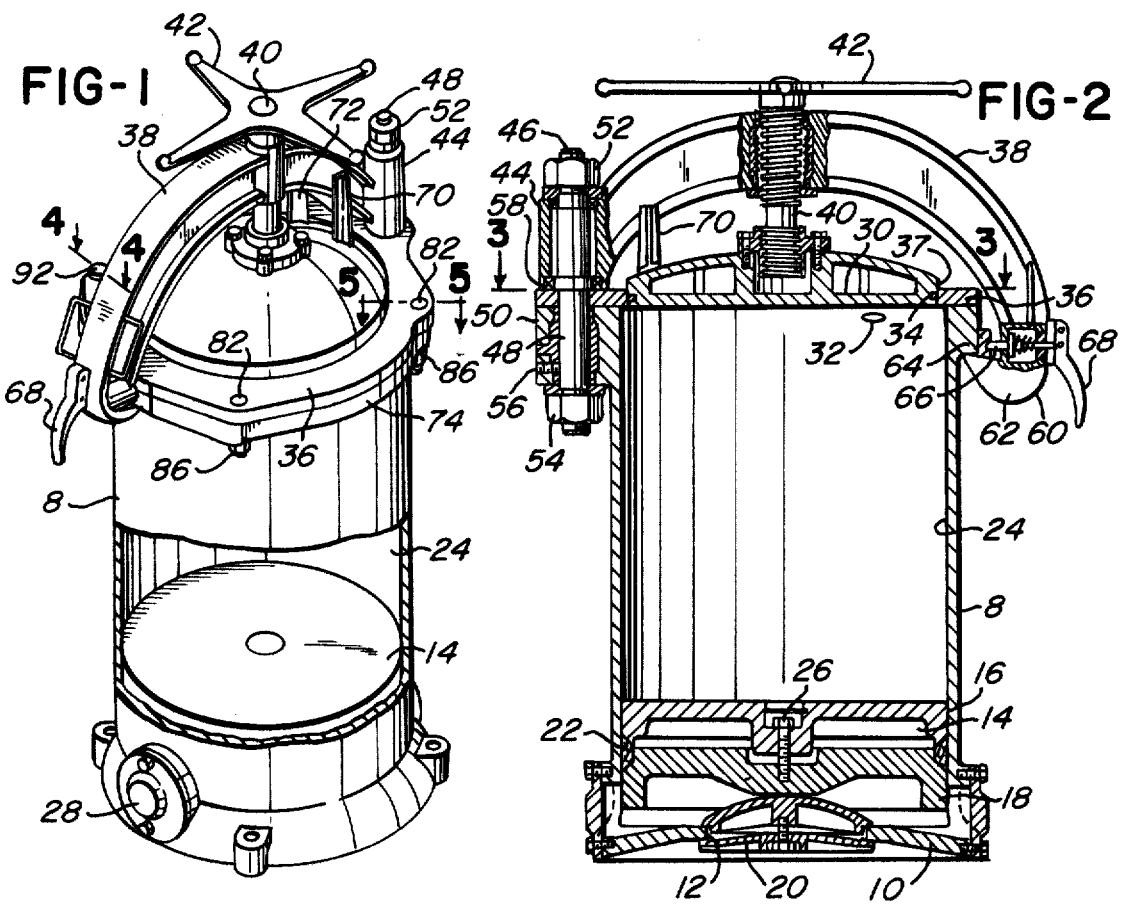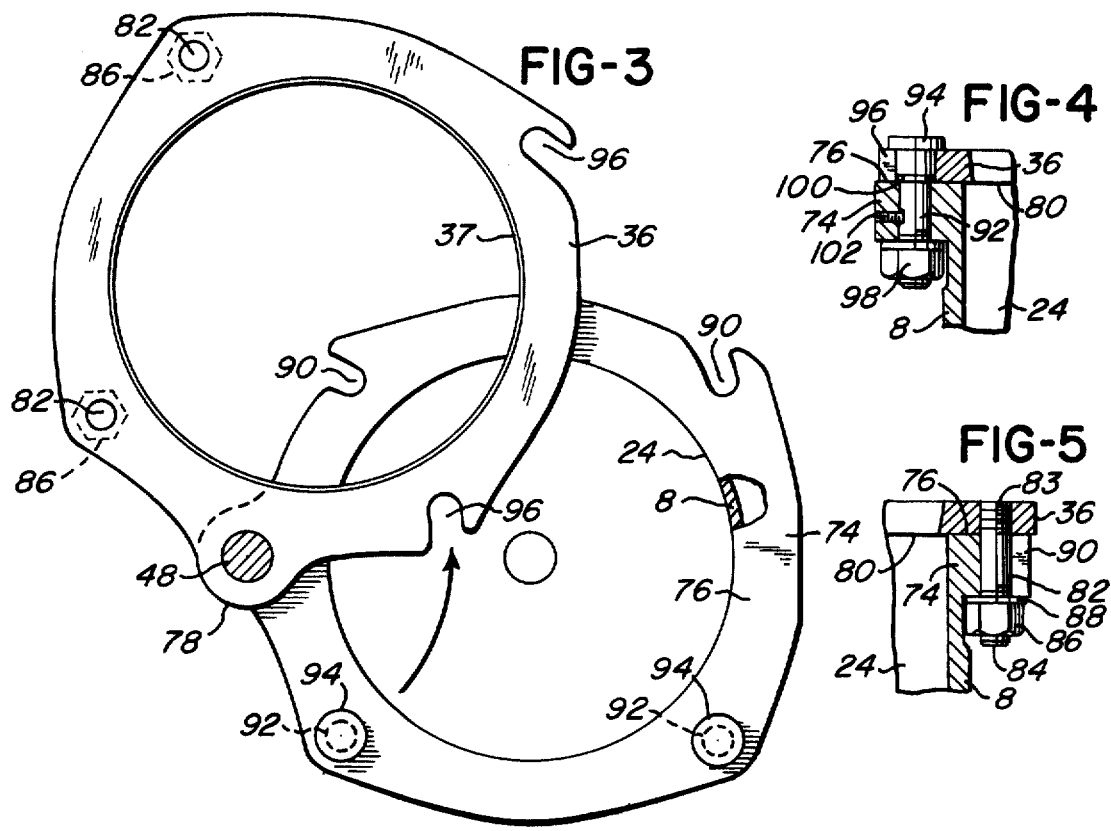

SAUSAGE STUFFER WITH QUICK-RELEASE SAFETY RING

BACKGROUND OF THE INVENTION

Sausage stuffers are machines widely used in the production of meat enclosed in flexible casings. In general, the stuffer comprises an upright cylinder having a top opening closed selectively by a displaceable cover member, the cylinder embracing a vertically movable piston adapted to support a quantity of meat dough or the like to be extruded through one or more nozzles as the piston advances under power toward the cover member. This general type of sausage stuffer is disclosed in U.S. Pat. Nos. 1,666,631; 1,628,726; 1,697,583; 1,880,182; and 2,309,345.

Usually, the stuffer cylinder is provided with a rigid safety ring such as 23 of U.S. Pat. No. 1,628,726, which overhangs as at 24 a marginal portion of the cylinder bore, to provide a stop for the ascending piston 14. The purpose of the safety ring overhang or abutment, is to preclude accidental forceful ejection of the piston from the cylinder bore when the cover member is in a displaced position during cleaning of the interior surfaces, or when recharging the cylinder with meat in plastic or dough form. The safety ring usually is securely fixed to an upper flange of the cylinder, as by means of a multiplicity of screws located beneath the cylinder flange as shown supporting the safety ring 23 in FIG. 1 of Knowlton. By removing the screws, the safety ring may be dismounted for periodic cleaning.

SUMMARY OF THE INVENTION

In accordance with the present invention, the so-called safety ring which limits upward projection of the piston, is provided with a quick-release mounting so that said ring may be displaced for periodic cleaning without the waste of time and labor entailed in removing a multiplicity of screws according to the teaching of U.S. Pat. Nos. 1,628,726 and 1,697,583. The improvement herein involves the use of a minimal number of fasteners which may be loosened, but not detached, whereby displacement of the safety ring is effected with ease and dispatch but without liklihood of mislaying or losing the fastener parts.

An object of the invention is to conserve time and labor in cleaning vital parts of the machine with the frequency and care demanded by stringent sanitation regulations applying to the industry.

Another object of the invention is to simplify the sausage stuffer construction, and expedite its daily output capability by eliminating waste of time and labor in keeping it operational with a minimum amount of down-time.

BRIEF DESCRIPTION OF THE DRAWING

FIG. 1 is a perspective view, parts broken away, showing a sausage stuffer incorporating the means of the present invention.

FIG. 2 is an enlarged vertical cross-section of the same, in operative condition.

FIG. 3 is an enlarged cross-section taken on line 3—3 of FIG. 2 showing the safety ring swung to a displaced position relative to the machine cylinder, preparatory to cleaning thereof.

FIG. 4 is a fragmentary enlarged cross-section taken on line 4—4 of FIG. 1.

FIG. 5 is a fragmentary enlarged cross-section taken on line 5—5 of FIG. 1.

DESCRIPTION OF THE PREFERRED EMBODIMENT

With reference to the drawing, the reference numeral 8 denotes a rigid cylinder having a bottom wall 10 closing the lower end of the cylinder. The bottom wall may have a central aperture 12 affording access to the lower end of the cylinder interior and to the underface of a piston 14 comprising the circular discs 16 and 18. The bottom wall aperture normally is closed by a fluidtight removable closure member 20, the details of which are immaterial to the present invention.

Piston 14 is provided with an annular packing ring or gasket 22 firmly supported by the discs 16, 18 to wipe the inner wall of cylinder bore 24 as the piston travels vertically within the bore. The discs may be joined together by an adjusting screw 26 that may be tightened when necessary so as to compress the gasket and expand it against the cylinder wall to maintain a firm seal therewith. As will be understood, pressured fluid is introduced through a port 28 and into the cylinder beneath the piston, for elevating the piston to the upper end of the cylinder. Accordingly, any soft meat dough resting upon the piston will be forcefully compressed against the cover 30 and caused to exude through one or more meat discharge ports 32 formed in the wall of the cylinder or in the cover itself. The meat so discharged will usually pass through a nozzle and into a sausage casing supported by the nozzle exteriorly of the cylinder, as is usual.

Cover 30 which closes the upper end of cylinder bore 24, may carry an annular gasket 34 that bears against the annular safety ring 36 to form a tight seal therewith. The cover may be suspended from a yoke 38 by means of a threaded rotary shaft 40 to be actuated by means of a handle 42 to elevate and lower the cover relative to ring 36, for respectively opening and closing the upper end of cylinder bore 24.

Yoke 38 includes a hub 44 bored vertically to accommodate a pivot shaft 46 which has a portion 48 anchored in the vertical bore of a boss 50. The boss may be integral with the material of the cylinder, if desired, and is extended radially therefrom. Opposite ends of the pivot shaft may be screw-threaded and provided with retaining nuts 52 and 54. The shaft will be locked against rotation by a set screw 56 threaded into the side of boss 50. The hub 44 of yoke 38 may be rotated about shaft 46 upon suitable anti-friction bearings 58, under certain conditions to be mentioned hereinafter.

The free or swingable end 60 of yoke 38 is developed into a hook 62 which is adapted to engage an abutment 64 on cylinder 8 located diametrically opposite the boss 50. A latch 66 which is normally operative to center the cover with respect to the cylinder bore and preclude lateral swinging of the yoke hook from engagement with abutment 64, is releasable by means of a handle 68 to free the yoke and permit swinging thereof about pivot shaft 48, provided that cover 30 has first been elevated by means of screw 40. The latch may be substituted therefor if desired. U.S. Pat. No. 1,666,631 may be referred to for details of operation of the cover suspension.

If desired, cover 30 may be provided with a pair of rigid spaced upstanding guide posts 70, 72 which loosely embrace the yoke and enforce swinging of the cover with the yoke, after the cover has been lifted sufficiently to disengage safety ring 36.

Attention is now directed specifically to the safety ring and its mounting means upon the cylinder. It is noted that cylinder 8 is formed with an integral outwardly directed annular flange 74 having an upper planar face 76 upon which may rest the planar safety ring 36. The safety ring, in the form of an apertured rigid plate or disc, is swingable in the plane of face 76, about pivot shaft 48. For this purpose, the ring is provided with an ear or boss 78 perforated to loosely receive said shaft. The flat underface 80 of the safety ring is accurately machined and fitted to the finished upper face 76 of cylinder flange 74, for full flatwise contact when the ring overlies the flange. Accordingly, the ring 36 may be swung about pivot shaft 48 as suggested by the arrow in FIG. 3.

Quick-release means is provided for securing the safety ring upon the upper face of cylinder flange 74 when the ring is in register with the flange (FIGS. 1, 2, 4 and 5). Said means include a pair of spaced depending stud bolts 82, 82 located at one side of pivot shaft 48, said bolts having their upper ends 83 screwthreaded or otherwise securely anchored in the material of the ring. The lower end 84 of each stud 82 are threaded to receive a rotatable nut 86 backed up by a washer 88.

On the arcs described by studs 82, 82, as the safety ring is swung about pivot shaft 48, the cylinder flange 74 is notched or cut away to provide open-mouthed notches or slots 90, 90 which are receptive of the shanks of studs 82, 82. Whenever the studs are swung into register with slots 90, 90, the nuts 86 on the studs may be tightened against the lower face of flange 74 to securely fix the safety ring upon the upper face of the flange.

A second set of quick-release means are provided in the form of bolts 92, 92 (FIG. 4), which include enlarged heads 94, 94 spaced from the upper face of flange 74 so that the ring 36, when swung into register with the flange, will project the openmouth slots 96, 96 of the ring into position about the shanks of bolts 92, 92 with the bolt heads 94 overlying the ring as in FIG. 4. Each of the bolts 92 carries a threaded nut 98 at its lower threaded end, to be tightened or loosened for clamping or releasing, respectively, the safety ring 36 relative to cylinder flange 74.

With further reference to FIG. 4, the numeral 100 indicates a resilient O-ring, or washer applied about the bolt shank and resting upon the upper face of flange 74, for the purpose of keeping the bolt head 94 elevated when nut 98 is loosened, so that the safety ring may easily be swung to the operative position without interference from the bolt head. The small screw 102 threaded into the side of flange 74 extends loosely into a slot in the shank of bolt 92, for the purpose of precluding rotation of the bolt as the nut 98 is turned thereon.

As best illustrated in FIG. 3, it will be noted that each of the open mouthed slots 90 of the cylinder are disposed on one side of a diameter which passes through the center of pivot shaft 48, whereas the open mouthed slots 96 of the safety ring 36 are disposed on the other side of said diameter.

The operation of the device is as follows. To charge the stuffer with meat or the like in plastic form, the operator will first rotate the hand wheel 42 to elevate cover 30 and withdraw it from sealing relationship with ring 36. Thereafter, latch 68 will be actuated to permit rotation of yoke 38 about pivot shaft 48, the yoke carrying with it the cover 30 by reason of the connection at guide 70. With piston 14 lowered, a charge of meat may be directed into the open top of the cylinder.

It will be noted that the safety ring 36 remains bolted in registry with the cylinder flange, and overhangs the bore of the cylinder sufficiently to stop the piston and prevent expulsion thereof from the upper end of the bore in the event of any inadvertent upward piston advancement. As shown herein, the central opening 37 of the safety ring is only slightly smaller than the cylinder bore, and is shown tapered for easy reception of the cover gasket 34. It should be understood, however, that the ring opening 37 need not accommodate the cover and gasket if the cover is made to seal atop the ring, as taught by U.S. Pat. No. 1,628,726.

The cylinder having been charged with meat, the operator now swings the yoke and cover 30 to the operative position of FIGS. 1 and 2, and lowers the cover to sealing position by rotating the handwheel 42. With the yoke properly latched, the stuffing operation may be commenced by introducing fluid under pressure to the lower face of piston 14, thereby to elevate the piston and effect a discharge of meat by compression through one or more cylinder ports 32. Ports 32 lead to suitable nozzles or horns exteriorly of the cylinder, where sausage casings are applied and filled with the meat so discharged.

As was previously stated herein, sanitation laws and regulations are rigidly enforced in the meat processing industry, and require frequent thorough cleaning of meat handling equipment. IN the case of sausage stuffers, thorough periodic cleaning is required of all internal parts including the safety ring 36 and particularly its overhang and junction with the upper margin of the cylinder bore. This area is highly vulnerable to stagnation and fouling of material, and cannot be thoroughly cleaned without displacement of the safety ring from the cylinder flange.

Heretofore, much time and labor were expended in removing the ring because of the nature of the fastening means employed in mounting the ring and securing it to the cylinder flange. For example, as in the Knowlton patent, safety ring 23 was demountable for cleaning only by laboriously removing a great number of screws, and replacement was equally time-consuming and laborious. In addition, there was involved a further waste of valuable time if any screws were lost or mislaid. In any event, keeping the apparatus operational without lengthy interruptions is a factor of great importance in the industry from the profit standpoint.

According to the present invention, displacement of the safety ring for effectual cleaning of the apparatus is accomplished with ease and dispatch by the mere loosening, not removal, of only a few fasteners such as 82, 82, 92, 92, which allows the ring to be swung laterally to a position of displacement from the cylinder flange (FIG. 3). Less than one full turn of each fastener nut may be required for quick release of the ring, or quick re-mounting thereof. Moreover, the possible loss of fastener parts is eliminated entirely, with obvious advantage.

What is claimed is:

1. In a sausage stuffer comprising a cylinder having a axial bore with a piston reciprocable therein and having an open end, an external rigid flange on one end of the cylinder bounding the open end thereof, said flange having an upper, substantially planar face exterior to said bore, a radially projecting boss on one side of said cylinder at said open end, a pivot pin secured at one end in said boss and projecting at its other end upwardly beyond the open end of the cylinder, a yoke pivotally carried at one end thereof on said pivot pin and having securing means on its other end for securing the yoke in position extended across the cylinder open end in spaced relation thereto, and an end closure member carried by the yoke in a position to selectively cover and uncover the cylinder open end, the improvement comprising a quick-release safety ring member having a lower planar face resting flatwise upon the upper face of said flange and having an inner periphery extending radially inwardly into the open end of the boss and serving as a stop for said piston, said pivot pin extending through said ring member and pivotally supporting said ring member for pivotal movement of said ring member away from the open end of the cylinder, and quick-release clamping means operatively connected with said ring member for selectively clamping and unclamping said ring member upon the upper face of the cylinder flange with ease and dispatch for securely though releasably securing the ring member in operative position relative to said flange, said quick-release clamping means comprising at least one open-mouthed slot in the periphery of said ring member, and a nonrotatable bolt element attached to said flange in position to enter said slot incident to relative movement of said ring member and flange to the operative position, and a nut on said bolt element to secure the ring member in position on the flange.

2. A stuffer as called for in claim 1, wherein said ring member carries at least one bolt element and at least one slot for reception, respectively, of a corresponding slot and a bolt element of said flange.

3. A stuffer as called for in claim 2, wherein the bolt elements remain attached to said ring member and said flange in all positions of the ring member.

4. A stuffer as called for in claim 1, wherein is included means fixing said bolt element against rotary movement.

5. A stuffer as in claim 1, wherein each of said ring member and said flange has a pair of slots in the periphery thereof on one side of a diameter thereof, and a pair of bolt elements carried by each of said ring member and said flange on the other side of the diameter thereof in a position to register with the respective slots.

6. A stuffer as in claim 5, wherein a nut is threadable on said bolt elements for clamping engagement with said ring member and flange to secure the ring member in operative position on the flange.

* * * * *